United States Patent [19]

Carlos et al.

[11] Patent Number: 5,437,756
[45] Date of Patent: Aug. 1, 1995

[54] METHOD OF MAKING A COMPOSITE SPHERE FOR A MOTION BASE SIMULATOR WITH A LOW CENTER OF GRAVITY

[75] Inventors: Joseph M. Carlos, Southbury; Thomas A. Carstensen, Shelton; William J. Hall, Cheshire; Larry J. Osiecki, Oxford, all of Conn.

[73] Assignee: United Technologies Corp., Hartford, Conn.

[21] Appl. No.: 257,459

[22] Filed: Jun. 9, 1994

Related U.S. Application Data

[60] Continuation of Ser. No. 914,258, Jul. 15, 1992, abandoned, which is a division of Ser. No. 553,871, Jul. 16, 1990, Pat. No. 5,182,150.

[51] Int. Cl.⁶ .......................... G09B 9/12; B29B 11/04
[52] U.S. Cl. ........................................ 156/245; 156/71; 156/242; 156/307.7; 434/40; 434/44; 52/81.1; 52/81.4; 359/451
[58] Field of Search ............... 52/80.1, 81.1, 82, 81.4, 52/81.2, 81.5; 156/153, 197, 242, 245, 292, 77, 71, 307.7; 434/40, 44; 359/451

[56] References Cited

U.S. PATENT DOCUMENTS

| | | | |
|---|---|---|---|
| 2,805,974 | 9/1957 | Brucker | 156/153 |
| 3,203,144 | 8/1965 | Fuller | 52/81.4 |
| 3,916,578 | 11/1975 | Forootan et al. | 52/81.2 X |
| 4,318,589 | 3/1982 | Brown et al. | 359/451 |
| 4,798,032 | 1/1989 | Rose, Jr. | 52/81.4 |
| 5,011,263 | 4/1991 | Hopper | 359/451 |
| 5,130,846 | 7/1992 | Kowalchuk | 359/451 X |

FOREIGN PATENT DOCUMENTS

| | | | |
|---|---|---|---|
| 1525983 | 9/1978 | United Kingdom | 52/81.1 |

OTHER PUBLICATIONS

Fretz, George C. "Building a Giant," *Plastics Engineering*, May 1960, pp. 111–116.
Makowski, Z. S., "Structural Applications of Plastics," *Interbuild*, Nov. 1964, pp. 16–25.

*Primary Examiner*—Jeff H. Aftergut
*Attorney, Agent, or Firm*—McAulay Fisher Nissen Goldberg & Kiel

[57] ABSTRACT

A simulator dome for a motion base simulator comprises one or more fiber reinforced outer layers, inner layers of a similar material and an intermediate core. The intermediate core is preferably a structural foam of variable density to allow selectively lowering the dome center of gravity to enhance the simulation capabilities of the motion system to simulate various flight maneuvers. By producing the dome from fiber reinforced polymer and using a core of variable density, a dome of unitary construction with no through fasteners is produced, having high strength for withstanding high G maneuvers without cracking or distortion, enhancing simulator effectiveness and increasing the accuracy of the simulated flight conditions.

2 Claims, 8 Drawing Sheets

METHOD OF MAKING A COMPOSITE SPHERE FOR A MOTION BASE SIMULATOR WITH A LOW CENTER OF GRAVITY

This is a continuation of application Ser. No. 07/914,258, filed Jul. 15, 1992, now abandoned, which was a divisional of application Ser. No. 07/553,871, filed Jul. 16, 1990, now U.S. Pat. No. 5,182,150.

TECHNICAL FIELD

This invention relates to simulator domes and more particularly to a high G, crack resistant simulator dome for use in a motion base simulator.

BACKGROUND OF THE INVENTION

In U.S. Pat. No. 3,135,057, a flight simulator is disclosed utilizing a sphere assembly mounted on a pedestal which has an air bearing for supporting the sphere. Three motor and race assemblies are located within the sphere which are able to impart rotary movement to the shell in three planes corresponding to roll, pitch and yaw. The center of gravity of the shell coincides with its geometric center. A projection screen on the inner surface of the sphere provides a pilot with a visual impression of flight as the dome moves in response to control signals.

Such a simulator, while possibly adequate at one time for simulating flight conditions would allow too much lag between control measures taken and the simulated response to adequately represent flight in a modern aircraft. Similarly, the sphere cannot achieve the high G maneuvers called for in simulating emergency type conditions, a major advantage of flight training in a simulator.

In U.S. Pat. No. 4,514,347, a static dome simulator is disclosed which has a layer of synthetic material bonded to a domed shaped geodetic structure, the geodetic structure providing sufficient strength to provide "a free Standing structure." In such a structure, the observed visual scene responds in a manner which simulates corresponding movement of an actual aircraft. However, while visual changes occur, the pilot does not get the actual feel of an aircraft changing under him nor feel how the changes in control response affect the center of gravity of the aircraft. Consequently, a static base simulator may not accurately represent flight conditions.

While motion base simulators using domes are known, such domes are typically produced of aluminum. FIG. 1 shows an aluminum skin motion base simulator. A dome 1 is mounted on a platform 2 supported by actuators 3 which impart movement to the dome to simulate YAW, pitch and roll maneuvers. The dome 1 has a plurality of panels 4 which mate at flanges 5. Juncture flanges 6 are located at the flange intersections. Typically, the panels are bolted together and the junctures are riveted. A superstructure 7 composed of interlocking trusses is used to stiffen the structure. As simulation technology has progressed, these domes have been subjected to higher G forces and stresses that, through repetitive dynamic loading on the flanges and junctures, can exceed the capabilities of the materials used, typically resulting in juncture failures and cracking. This necessitates dampening the action of the actuator system to prevent dome damage. This limits the simulator's ability to accurately duplicate normal aircraft and emergency manuevers. Also, such damage to the dome detracts from the projected image.

SUMMARY OF THE INVENTION

It is an object of the present invention to provide a simulator dome for a motion base simulator which is crack resistant.

It is a further object to provide a simulator dome having a low center of gravity to accurately simulate the feel of an aircraft, during normal and emergency maneuvers.

It is another object to provide a simulator dome which has a smooth and crack free inner surface to be used as a projection screen, up to a full 360°.

It is another object to provide a simulator dome that exhibits minimized deflection during high G maneuvers to prevent screen distortion.

It is another object to provide a simulator dome of unitary construction with no through fasteners in any part of the viewing area.

These and other objects of the present invention are achieved by providing a simulator dome for a motion base simulator comprising an outer fiber reinforced composite layer, an inner fiber reinforced composite layer and an intermediate core disposed therebetween. The inner and outer fiber layers preferably have a similar fiber orientation, such as $+/-45°$ with or without $0°/90°$ center plies. Preferably the outer and inner layers comprise up to five fiber plies overlaid to provide a strong spherical structure. The intermediate core separates the inner and outer layers, adding stiffness while providing a means of resisting shear loads. The core may be of different densities in different portions of the dome to reduce weight or adjust the center of gravity. A relatively high density core material could be located in the lower hemisphere of the dome and a lower density core material located in the upper hemisphere to lower the center of gravity and the systems inertia making the actuator system more responsive for simulating higher G manuevers. The inner layer has a smooth surface with all bond lines blended to give a seamless appearance, and may also have a reflective coating to provide a reflective screen.

Preferably, the inner and outer layers are fiberglass fiber reinforced with the intermediate layer having a selectable density of from 2-10 lbs/ft$^3$ and, more preferably 3.5 to 6.2 lbs./ft$^3$. The inner reinforced fiber layer, intermediate core and outer fiber reinforced layer are bonded into a unitary structure to provide a high strength, high G resistant dome for performing complex maneuvers without cracking or distortion.

DETAILED DESCRIPTION OF THE INVENTION

Figure 1:
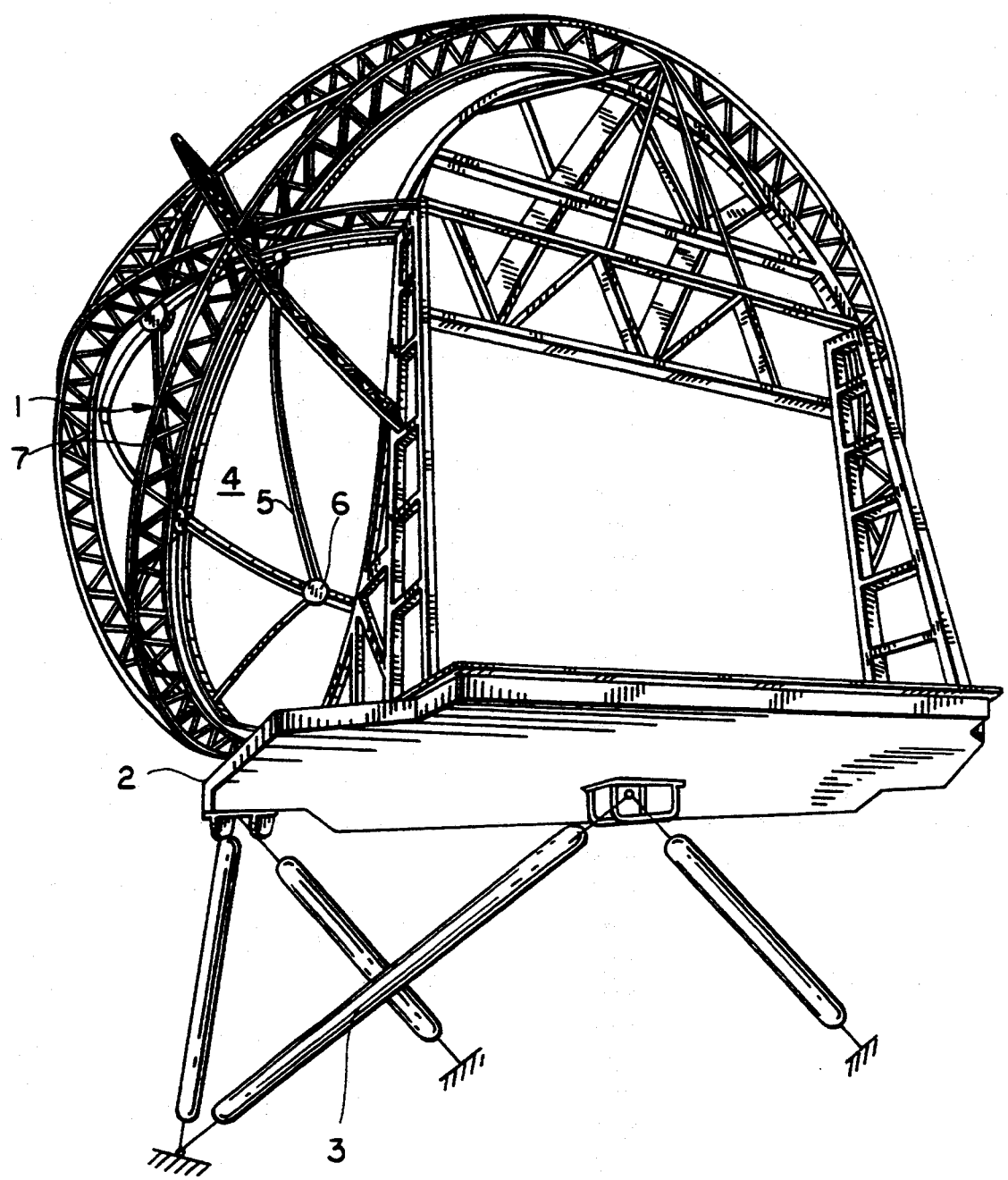
FIG. 1 is a view of a prior art motion base simulator dome.
Figure 2:
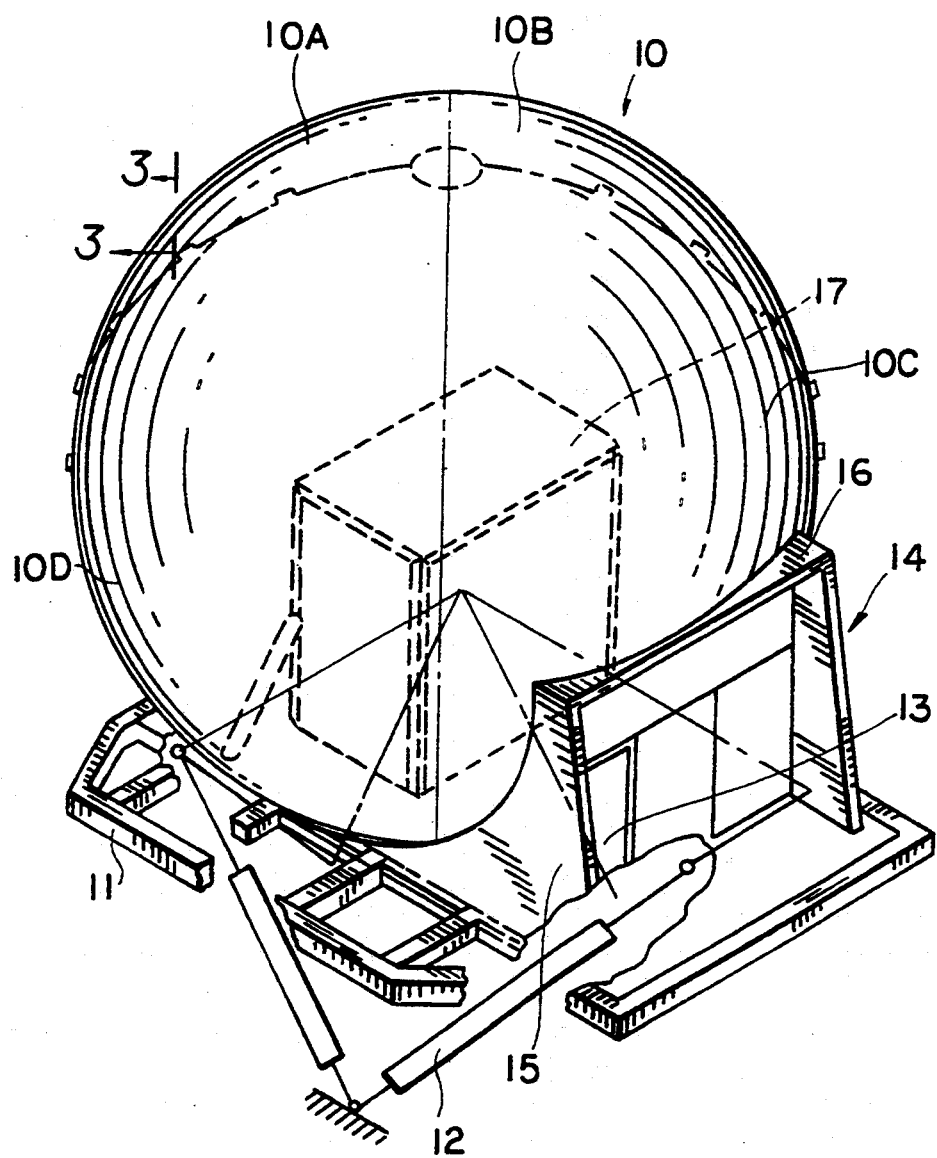
FIG. 2 is an illustrative view of the motion base simulator dome of the present invention.

Referring to FIG. 2, a simulator dome 10 is mounted on a platform 11, similar to the prior art platform 2. The dome and platform are movable into simulated pitch, roll and yaw using actuators 12. Six actuators are typically used to simulate such flight conditions. Of course, the type and number of actuators may vary, depending on the type of training anticipated. It should be noted however, that with the inventive dome, actuators and control systems that can deliver even higher frequency control responses than those presently used may be accommodated. Thus, the dome structure may no longer be a limiting factor in designing simulator systems.

The dome 10 has a doorway 13 surrounded by a supporting structure 14 including sidewalls 15 and a top 16. The structure 14 additionally stiffens the dome for resisting distortion during complex maneuvers. However, such a structure 14 need not be included to practice the invention. The structure 14 may be made of steel, aluminum or made of a similar material as the dome itself. An internal platform 17 is disposed within the dome, which would house the simulator cockpit and typically is used for supporting the projection equipment.

The dome 10 is composed of four prefabricated panels 10A, 10B, 10C, and 10D, to provide ease in erection. This is primarily necessitated by size, as these domes may be 20–30 feet in diameter. Of course, smaller or larger domes may benefit from this invention, and from 2-10 or more panels could be prefabricated for assembly.

Figure 3:
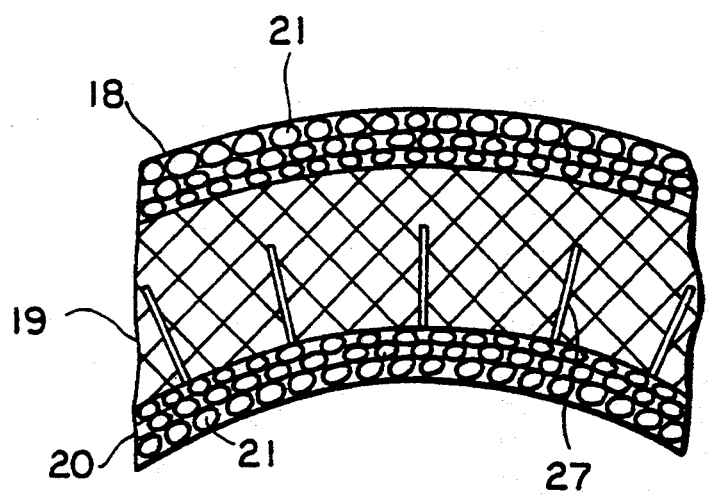
FIG. 3 is a partial cross sectional view of a portion of the dome taken along the line 3—3 of FIG. 2.

Referring to FIG. 3, a partial cross-section of the dome is shown taken along line 3—3 of FIG. 2. The dome 10 has an outer layer 18, intermediate core 19 and an inner skin layer 20. The inner and outer layers use fibers 21 for strength. The outer layer comprises one or more fiber reinforced plies, impregnated with a polymer system, preferably fiberglass reinforced epoxy. The fibers 21 are preferably oriented in a quasi isotropic manner such as a +/−45° fiber orientation or +/−45° fiber orientation with a 0°/90° center ply. Such oriented fibers maximize strength and minimize distortion.

Figure 4:
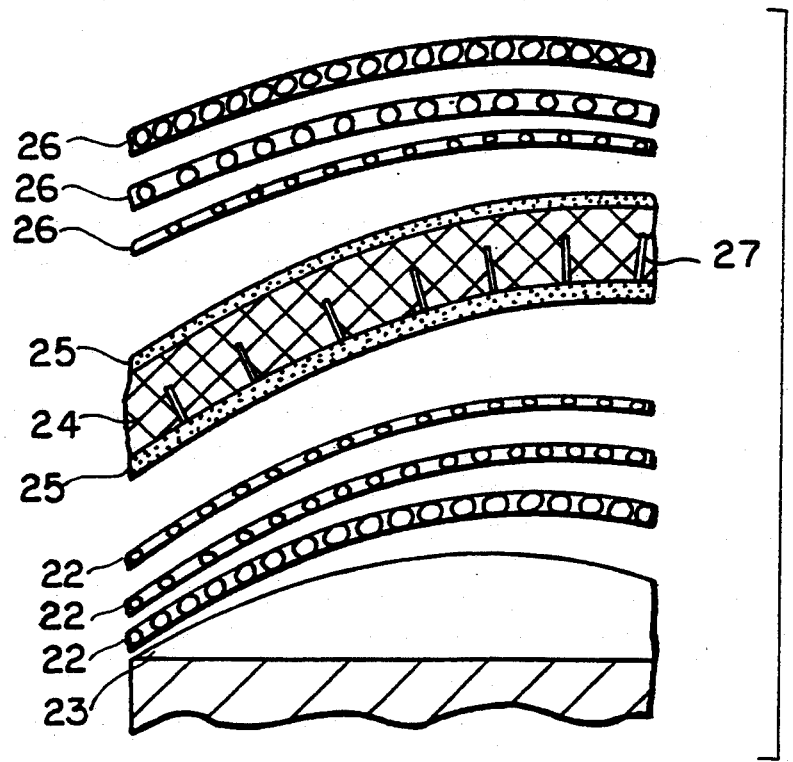
FIG. 4 is an exploded view of one of the dome panel assemblies which are used to fabricate the dome.

Referring to FIG. 4, the fabrication of panel 10A is shown. Three fiberglass layers 22 are applied to a mold 23 having a mold surface of the desired curvature to produce a spherical dome. A core material 24 is laid onto the layers 22 and may be bound thereto using an adhesive 25, which preferably coats both sides of the core. Three impregnated fiberglass layers 26 are then laid over the core. The assembly is then consolidated using a vacuum bag technique and cured. While three plies are shown, it will be understood that from 1 to 5 plies could be used. Also, the number of plies could vary on different portions of the dome. For example, the upper portions may use two plies (inner and outer) while the lower portions may use three plies (inner and outer) to assist in lowering the center of gravity. Each panel may have structures bonded thereto to facilitate alignment during assembly and each panel further has means for attaching to the platform.

The core is preferably a material having a density of from 2 to 10 lbs./ft.$^3$. The core has a thickness of 0.5–2.0 inches, and is preferably 1.0 inch. In a preferred embodiment, different portions of the dome use a core material of different density such that the top of the simulator dome will have a lower density material than the lower hemisphere. This allows adjusting the dome's center of gravity for improved flight simulation. Materials usable as the core include wood, i.e., balsa wood, or polyurethane, polyimid, polystyrene or polyvinyl chloride (PVC) foam, among others. Combinations of these materials may also be used, such as a wood/foam combination. To obtain a low center of gravity, and for high strength, a 6.2 pound per cubic foot PVC foam may be used in the lower panel portions and a 3.5 pound per cubic foot foam used in the upper panel portions. For example, a KLEGECELL ™ PVC foam, produced by KRP Plastiques, Trilport, France, may be used.

The foam or wood core may be supplied in pre-cut sheets for lay-up on the mold over the inner fiberglass reinforced layers. To allow for the curvature of the dome surface, the foam or wood may be pre-sliced, with slits 27 (shown in FIG. 4) in both the X and Y directions accommodating the curvature. Preferably, the precut sheets are coated with the adhesive, which also fills the slits. The sheets are then placed on the inner fiber reinforced layers. The outer layers are placed over the core material and the assembly consolidated and cured.

The polymer system and/or adhesive may be epoxy, polyester, polyurethane or any other suitable material, with epoxy preferred for its advantageous structural properties. The fibers may be glass, aramid, graphite, and may be mesh, weaved or chopped, depending on the structural needs however directional fibers are preferred.

Figure 5A:
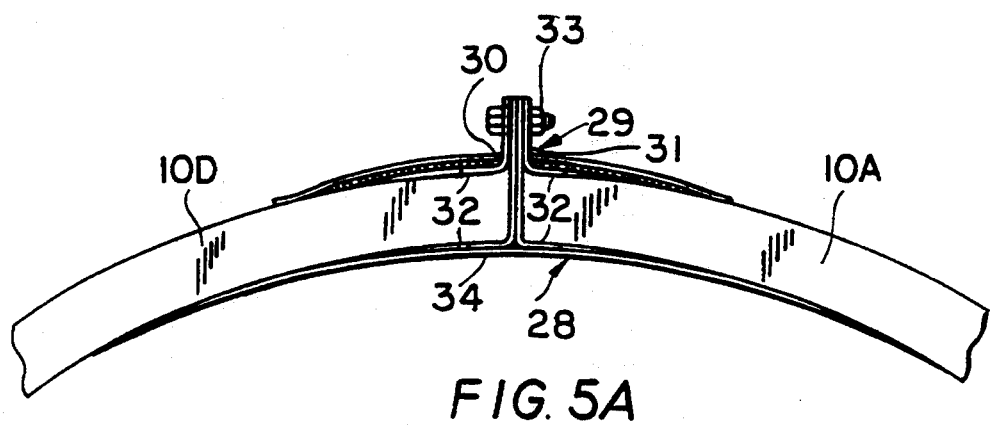
FIGS. 5A and 5B illustrate a typical panel joint.

Referring to FIG. 5A, a joint 28 is shown between two prefabricated panels. A preformed clip 29 is disposed between the panels and has two portions, one portion 30 bonded to one panel and a second portion 31 bonded to the other panel. Each portion has plies 32 bonded to the inner and outer layers. A bolt 33 extends through the clip to bolt the panels together. At least one splice ply 34 is placed over the joint between the inner layers to assure a smooth surface. Since a plurality of spaced apart clips are used externally, no through fasteners are used in the viewing portions of the dome, though fasteners may be (but need not be) placed through the dome at the juncture between the dome and the platform.

Once the panels are in alignment, one or more additional fiber layers are applied over each seam on the internal surface of the skin layer to cover the seams to provide a continuous inner surface. Preferably, in molding the panels, an indented area is provided to accommodate the seam overlay plies and provide a smooth surface. Typically, multiple layers of fiberglass reinforced epoxy are used.

Figure 5B:
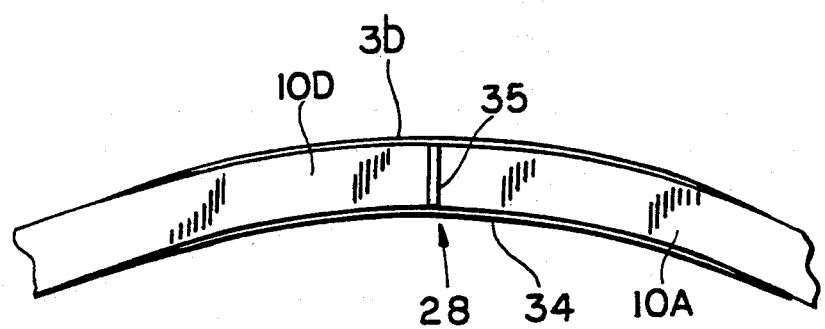

Referring to FIG. 5B, the joint 28 is again shown, but at a point between the clips. A gap 35 approximating the thickness of a clip, is filled, preferably with either the adhesive or a compatible ,polymer to provide a unitary structure. The splice joint plies 34 cover the joint on the inner surface as described previously. Additional splice joint plies 36 cover the filled joint on the outer surface between the clips.

After curing, the inner surface of the simulator dome is preferably gauged to assure uniform curvature and the surface then coated with a reflective paint to allow the surface to act as a projection screen. In a preferred embodiment a high gain paint is used to enhance the visual image.

Figure 6A:
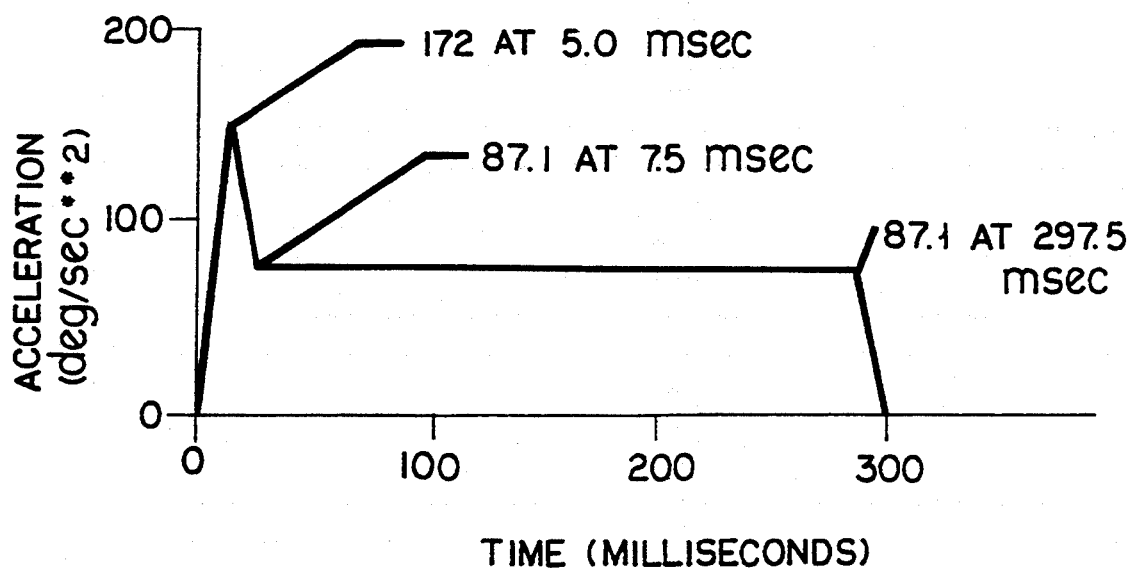
FIGS. 6A, B, C, D and E are plots showing design transient loadings which occur during selective emergency maneuvers in the dome.

The assembled dome is of high strength to resist G forces which cause distortion and cracking. FIGS. 6A, B, C, D and E show different loading suitable for design and testing of the motion base simulator for simulating helicopter emergency conditions. The static loadings on the dome are shown in Table I:

TABLE I

| Axis | Static Peak Acceleration |
| --- | --- |
| Vertical | +/− 1.1 g |
| Lateral | +/− 1.1 g |
| Longitudinal | +/− 1.1 g |
| Pitch | +/− 230°/sec$^2$ |
| Roll | +/− 220°/sec$^2$ |
| Yaw | +/− 340°/sec$^2$ |

Figure 6B:
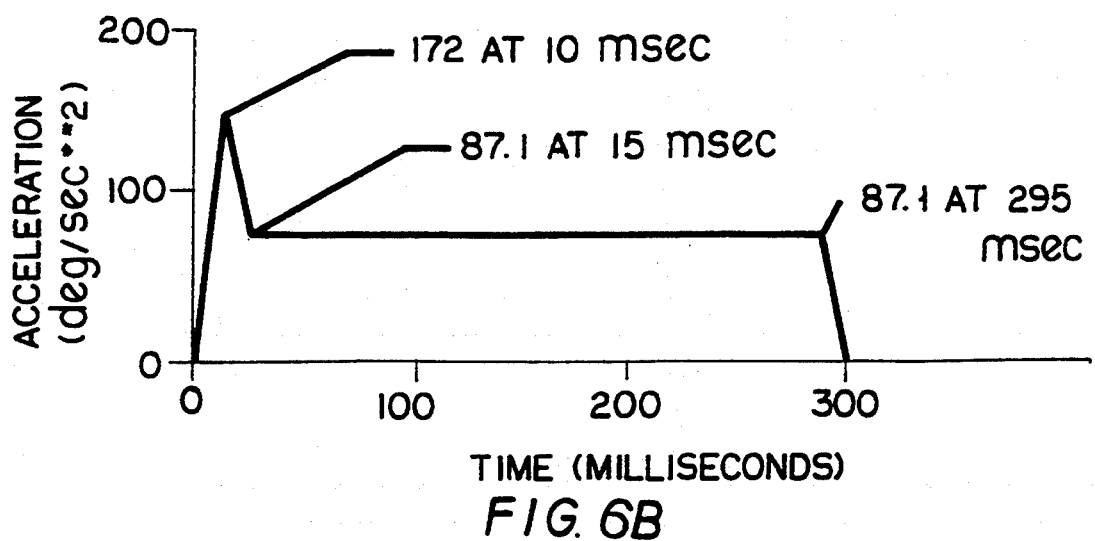
Figure 6C:
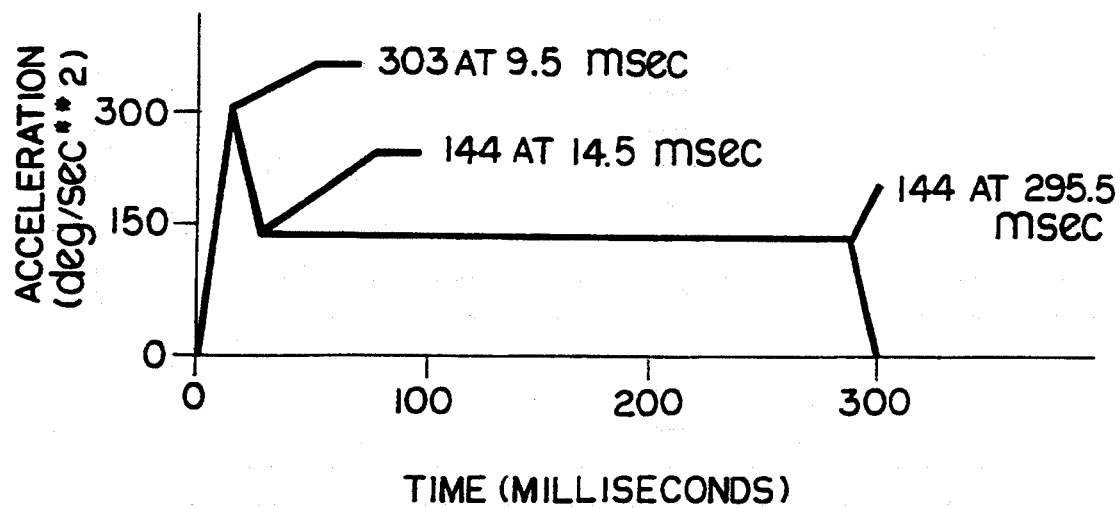
Figure 6D:
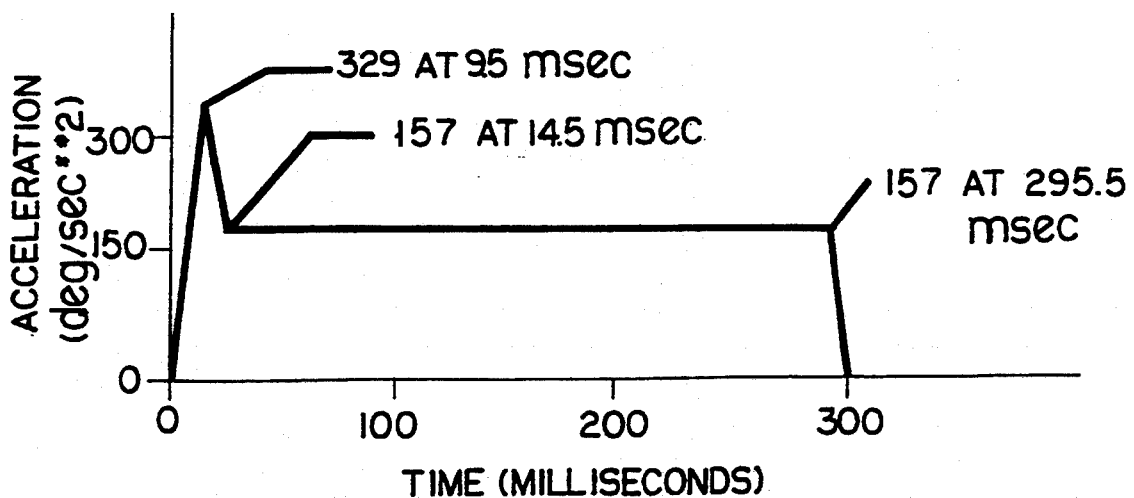
Figure 6E:
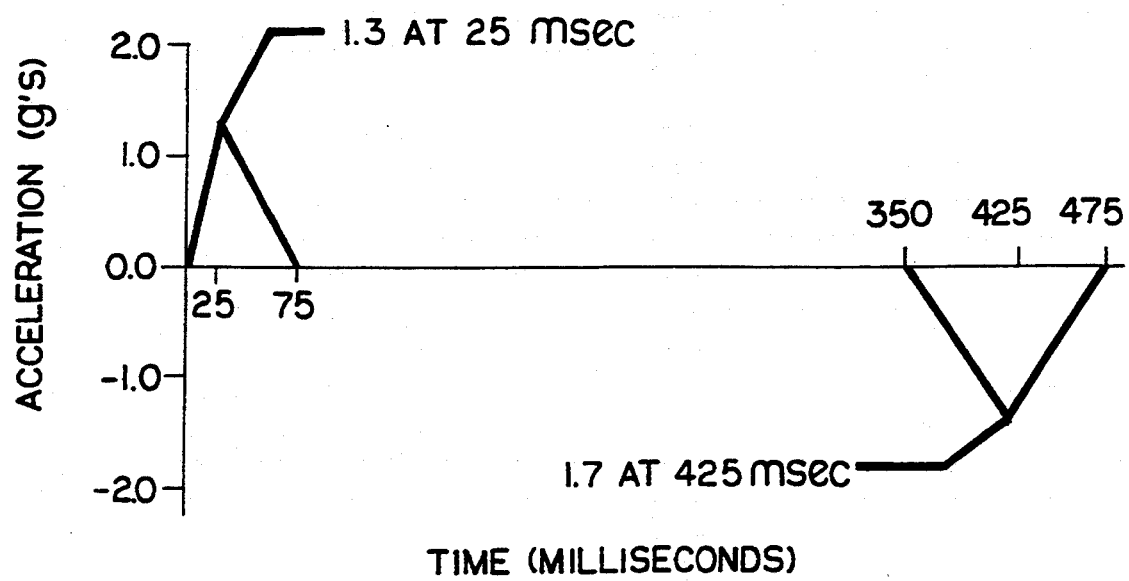

Referring to FIG. 6A, an aft toggle failure is shown causing a forward tilt pitchdown of 35.5°. The instant center of rotation (ICR) in such a maneuver is 185.15 inches below and 28.75 inches forward of the dome's geometric center (DGC). FIG. 6B shows an aft toggle failure with a +/−120° off axis. The pitchdown is the same, 35.5°, but the forward tilt is off axis by +/−120°. The ICR is 41.37 inches aft and 40.38 inches left or right and 185.15 inches below the DGC. In FIG. 6C, a maximum negative pitch failure is shown with a pitch up at 42° and having an aft tilt. The IRC is 36.06 aft and 231.58 inches below the DGC. FIG. 6D shows a maximum negative pitch failure with a +/−120° off axis. The tilt down in this situation is 42°, +/−60° on either side of forward and the IRC is 8.97 inches aft and 15.64 inches left or right and 231.85 inches below the DGC. Referring to FIG. 6E, the worst case emergency shutdown motion is shown which occurs when a maximum step up displacement command is followed by a motion direction reversal after attainment of maximum vertical velocity.

Figure 7:
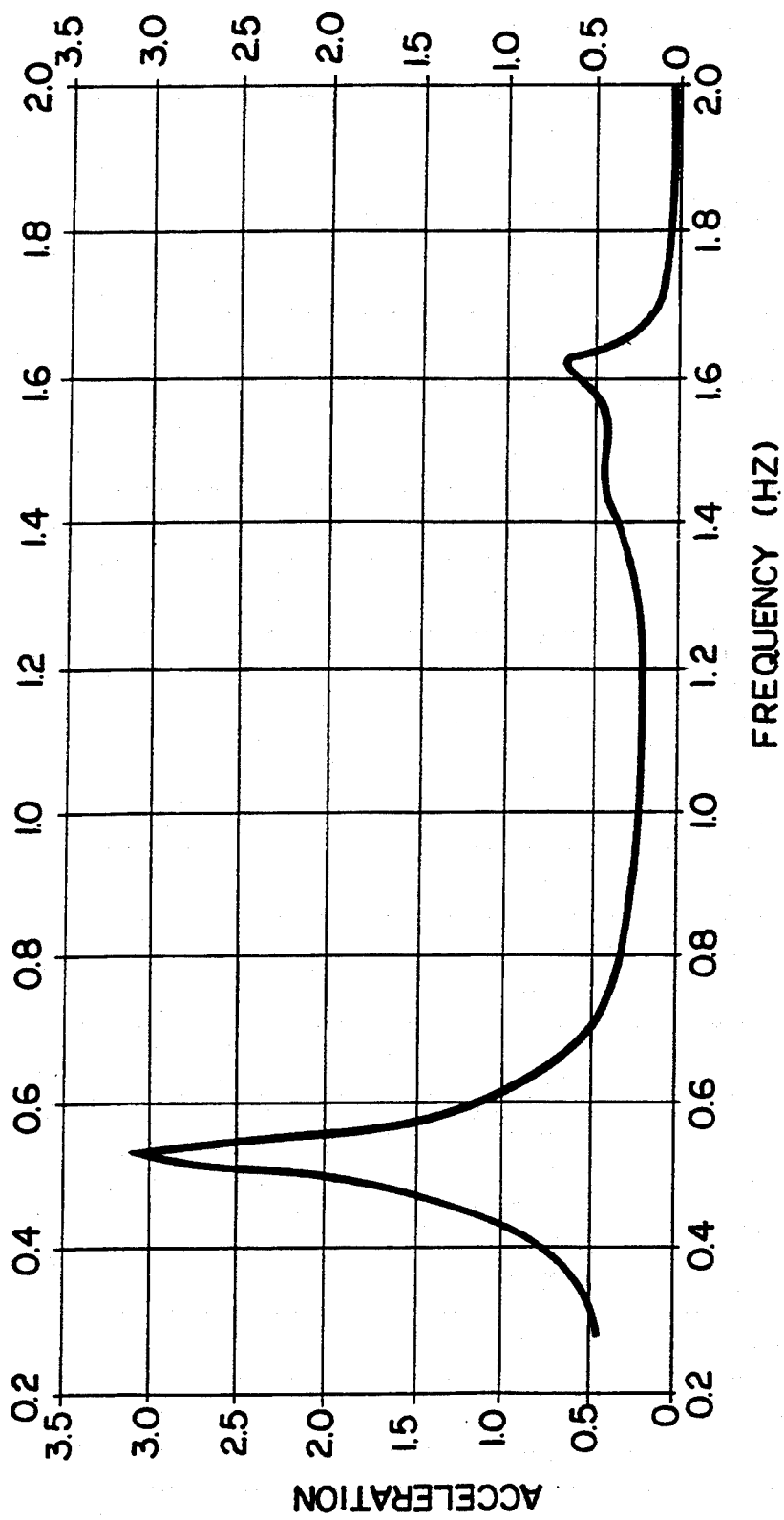
FIG. 7 is a graph showing a design G manuever, calculated at the top of the dome.

Referring to FIG. 7, the critical force response at the dome top is shown. The inventive dome structure is designed to withstand accelerations during the shown resonance. The previous aluminum dome exhibited cracking and fastener failure during this type of event. Table II shows the G forces at the dome top and at the top of the internal platform.

After assembly, the simulator dome was tested to evaluate performance and frequency response. The dome was tested at its resonance frequency to evaluate the dome under the most adverse conditions possible. The dome satisfactorily withstood a 3.46 g peak acceleration at the dome top during a maximum velocity roll maneuver, with the dome designed to survive up to an 8 g maneuver at the dome top.

While a composite dome using fiberglass reinforced epoxy with a foam core has been shown, it will be understood by those skilled in the art that various changes in the materials of construction could be made without varying from the scope of the present invention. For example, balsa wood could be substituted for the core without varying from the scope of the invention.

What is claimed is:

1. A method for fabricating a crack resistant simulator dome used in simulating high G maneuvers in a motion base simulator, the dome being mounted on a base which is movable to exert high G forces on the dome comprising:

providing a mold having a mold surface corresponding to an inner surface of the dome;

placing an inner fiber reinforced polymer impregnated layer on the mold surface;

providing a foam core material having predetermined different densities;

placing the core material of predetermined different densities in designated locations on the first fiber layer;

placing an outer fiber reinforced polymer impregnated layer on the core material;

consolidating and curing the layers to form a unitary structure, the structure having different densities in designated different portions thereof to adjust the center of gravity of the dome, and mounting the dome on the base which moves the dome to exert high G forces on the dome.

2. The method of claim 1 wherein the mold has a mold surface which corresponds to one section of the simulator dome, and the method further comprises consolidating and curing a plurality of dome sections, and assembling the plurality of cured dome sections to form the dome having different densities in designated different portions thereof.

* * * * *

TABLE II

| | DOME TOP | | | LV PLAT. TOP | |
| --- | --- | --- | --- | --- | --- |
| LOAD CASE | RESONANT FREQUENCY (Hz) | MAX. DISPLAC. (in.) | MAX. ACCELER. (g's) | MAX. DISPLAC. (in.) | MAX. ACCELER. (g's) |
| 1) Long Translation (X) | 6.38 | 1.16 | 4.86 | 0.80 | 3.31 |
| 2) Lat. Translation (Y) | 5.27 | 2.65 | 7.61 | 1.78 | 5.11 |
| 3) Vert. Translation (Z) | 11.39 | 0.21 | 2.71 | 0.19 | 2.54 |
| 4) Long. Rot. (Roll, RX) | 5.27 | 2.78 | 7.98 | 1.87 | 5.36 |
| 5) Lat. Rot. (Pitch, RY) | 6.38 | 1.29 | 5.30 | 0.87 | 3.59 |
| 6) Vert. Rot. (Yaw, RZ) | — | small | small | small | small |